United States Patent
Pal et al.

(10) Patent No.: US 12,393,565 B2
(45) Date of Patent: Aug. 19, 2025

(54) LOAD UNIT CONVERSION WITH UNIFIED PERSISTENCE

(71) Applicant: SAP SE, Walldorf (DE)

(72) Inventors: Souvik Pal, Bengaluru (IN); Deepak Shrivastava, Pune (IN); Kantikumar Kantikumar, Bengaluru (IN); Janardhan Hungund, Pune (IN); Sebastian Seifert, Heidelberg (DE); Bernhard Scheirle, Leimen (DE); Amit Pathak, Pune (IN); Amit Saonerker, Pune (IN); Amit Sankhla, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/535,176

(22) Filed: Dec. 11, 2023

(65) Prior Publication Data

US 2025/0190416 A1    Jun. 12, 2025

(51) Int. Cl.
*G06F 16/00*         (2019.01)
*G06F 12/1009*     (2016.01)
*G06F 16/22*        (2019.01)

(52) U.S. Cl.
CPC ...... *G06F 16/2282* (2019.01); *G06F 12/1009* (2013.01)

(58) Field of Classification Search
CPC .................. G06F 16/2282; G06F 12/1009
See application file for complete search history.

(56) References Cited

U.S. PATENT DOCUMENTS

| | | | |
|---|---|---|---|
| 2016/0147457 A1* | 5/2016 | Legler | G06F 3/0605 |
| | | | 707/601 |
| 2018/0246809 A1* | 8/2018 | Rebholz | G06F 3/061 |
| 2020/0387495 A1* | 12/2020 | Pathak | G06F 3/0673 |
| 2020/0387502 A1* | 12/2020 | Florendo | G06F 16/2379 |

\* cited by examiner

*Primary Examiner* — Syed H Hasan
(74) *Attorney, Agent, or Firm* — Mintz Levin Cohn Ferris Glovsky and Popeo, P.C.

(57) ABSTRACT

A database system detects a query targeting a first database object stored in a unified persistence format in a persistence store, where a first load unit is specified for loading the first database object into an in-memory store. The database system determines whether to convert the first load unit to a second load unit based on one or more conditions. In response to determining to convert the first load unit to the second load unit for the first database object, the first database object is loaded into the in-memory store according to the second load unit without performing a rewrite of the first database object in the persistence store. In an example, the first load unit is a column-loadable unit and the second load unit is a page-loadable unit.

16 Claims, 15 Drawing Sheets

LOAD UNIT CONVERSION WITH UNIFIED PERSISTENCE

TECHNICAL FIELD

The present disclosure generally relates to database processing.

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users and applications in order to organize, create, update, capture, analyze and otherwise manage the data in the database.

In order to efficiently handle queries, databases are typically configured to perform in-memory operations on data. In an in-memory database, data needed to execute and respond to a query is loaded into memory, and the query is executed against that in-memory data. However, many applications have large data stores, and loading all of the required data into memory for these applications may be difficult due to memory limitations. The amount of data being processed by database systems continues to increase faster than memory devices are evolving to store more data.

SUMMARY

In some implementations, a database system detects a query targeting a first database object stored in a unified persistence format in a persistence store, where a first load unit is specified for loading the first database object into an in-memory store. The database system determines whether to convert the first load unit to a second load unit based on one or more conditions. In response to determining to convert the first load unit to the second load unit for the first database object, the first database object is loaded into the in-memory store according to the second load unit without performing a rewrite of the first database object in the persistence store. In an example, the first load unit is a column-loadable unit and the second load unit is a page-loadable unit. The column-loadable unit involves having a data subcomponent, a dictionary subcomponent, and an index subcomponent of a corresponding database object serialized together into a single page chain, and wherein the page-loadable unit involves having a separate page chain for each of the data subcomponent, the dictionary subcomponent, and the index subcomponent of the first database object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
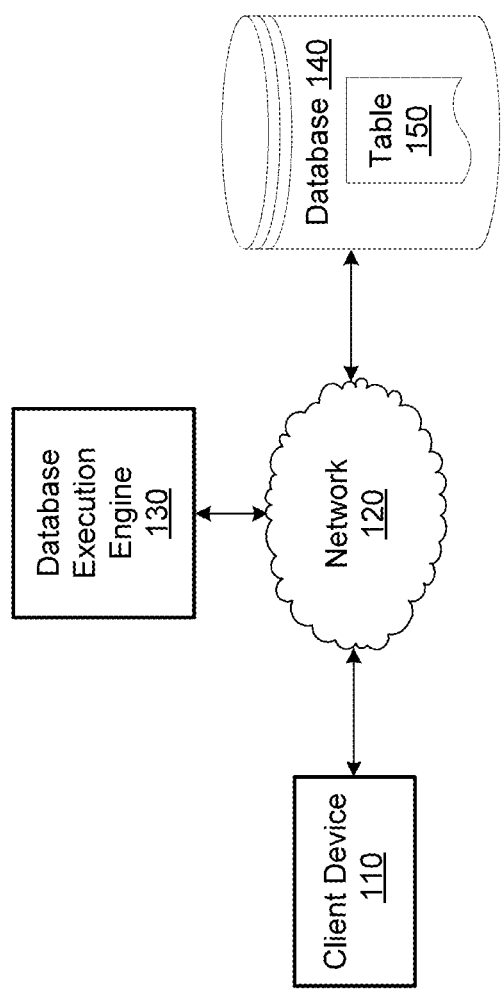
FIG. 1 illustrates an example of a database system, in accordance with some example implementations of the current subject matter.

Data structures are commonly created and populated in memory, and once populated, data structures may be persisted in persistence storage. Once in persistence storage, a data structure may be removed from memory when not needed. Then, if the data structure is again needed in memory at a future time, the data structure can be reconstructed from the information persisted in persistence storage. Loading a data structure refers to the reconstruction of the data structure in memory from the information persisted in the persistence storage. The representation of the data structure in persistence storage may not match the representation in memory, but the information stored in persistence storage is sufficient to allow for full reconstruction of the data structure in memory.

In a database, a database object is a data structure used to either store or reference data. A common type of database object is a table. Other types of database objects include columns, indexes, stored procedures, sequences, views, and others. The database may store each database object as a plurality of substructures that collectively forms and represents the database object. It is noted that the terms "substructure" and "subcomponent" may be used interchangeably herein. For a column, the substructures may include a dictionary, a data vector, and an index. The dictionary may associate each unique data value with a corresponding value identifier (ID). The value IDs may be numbered sequentially. The data vector may include value IDs that map to the actual values of the database object. The index may include a sequential listing of each unique value ID and one or more positions in the data vector containing the value ID.

When bringing database objects from persistence locations to in-memory locations, databases can bring the database objects into memory using multiple different formats. For example, one format is referred to as a column-loadable format. For the column-loadable format, the entire column is fully loaded into memory when the column is being queried. Fully loading the entire column into memory means bringing the entirety of the column's subcomponents (e.g., data, dictionary, and index) into memory. Another type of format that can be employed is referred to as a page-loadable format. For the page-loadable format, only the pages which contain parts of the column relevant to the query are loaded into memory. In other embodiments, other types of formats may be employed.

When loading data into memory, a load unit may be used to specify in which format to load the data and the granularity of data being loaded from persistence. In other words, the "load unit" defines the granularity of data being loaded into the in-memory store from the persistence store. A data description language (DDL) statement may change the load unit of various database objects such as a table, a partition or set of partitions of a table, a column or set of columns of a table, or a composite index defined on a table. In an example, the different types of load units that may be specified include page loadable, column loadable, and default loadable. For the default loadable format, database objects inherit their parent's load unit recursively.

While the format or load unit specifies how a column should be loaded into memory, the format does not necessarily determine how the column should be persisted. In a typical database deployment, the column-loadable format and page-loadable format load units use different persistence based on their load unit definition. For example, a column-loadable column has traditionally been persisted by serializing the column's data, dictionary, and index in a single page chain. For page-loadable columns, these columns have traditionally been persisted using a paging scheme such that the page containing the required column portion for the query is easily identifiable and can be brought into memory for access. For a page-loadable column, a separate page chain is persisted for each of the column's data, dictionary, and index subcomponents.

In some embodiments, when bringing database objects from persistence locations to in-memory locations, databases can determine whether to load database objects in a column-loadable format or in a page-loadable format depending on the current workload, a corresponding attribute, and/or one or more other operating conditions. In some cases, storing the database objects in the column-loadable format is preferable, while in other cases, it is preferred to store the database objects in the page-loadable format. The mechanisms and data layout for storing database objects in column-loadable format differ from the configuration for storing database objects in the page-loadable format. Therefore, switching between the two configurations has traditionally required a full rewrite of the data persistence. The rewrite results in the consumption of considerable memory and processing resources. Accordingly, for traditional databases, switching between in-memory formats can be expensive in terms of memory and processing resources utilized due to the necessary rewrites. Therefore, improved techniques are desired that do not require persistence rewrites for converted load units.

In an example, if the given database object has a column-loadable load unit, and the processing logic decides not to convert the load unit, then the given database object is loaded into the in-memory store in the column-loadable format. When loading a column into the in-memory store in the column-loadable format, the processing logic loads the entire column into the in-memory store. If the given database object has a page-loadable load unit, and the processing logic decides not to convert the load unit, then the given database object is loaded into the in-memory store in the page-loadable format. For the page-loadable format, the processing logic loads only the relevant pages into the in-memory store.

In an example, less frequently used tables are brought into memory in a page-loadable format, even those tables having a column-loadable load unit. For these less frequently used tables, only the relevant pages are brought into memory for the query being executed. In some embodiments, more frequently used tables are brought into memory in column-loadable format, even those tables having a page-loadable load unit. For these more frequently used tables, the entire column is brought into memory. In some embodiments, when storing to the persistence store from the in-memory store, the processing logic stores database objects into a single unified persistence format regardless of their in-memory format.

The unified persistence format allows each database object to be loaded into memory in column-loadable format or page-loadable format from the same persistence. The unified persistence format also allows for a load unit conversion for a given database object without requiring a rewrite of the given database object in the persistence store. The unified persistence format includes a separate composite page chain for the data, dictionary, and index subcomponents of the given database object. A composite page chain may have one or more sub-page chains.

Another type of persistence format is a serial persistence format which involves storing subcomponents together in a sequential manner such as in a single page chain. The serial persistence format may be suitable for scenarios where data components are relatively small and can be efficiently stored together in a single chain. The serial persistence format is often used for smaller datasets and offers advantages such as compact storage and faster access of the dataset. On the other hand, the unified persistence format is more suitable for larger and more complex datasets, where subcomponents may vary significantly in size. The unified persistence format allows each subcomponent to be stored optimally and independently from the other subcomponents, taking into consideration each subcomponent's specific size and characteristics. The unified persistence offers advantages such as improved performances, and the ability to load the persisted data in a either a column-loadable or page-loadable format, which is not available if the dataset was saved in the serial persistence format.

Referring now to FIG. 1, a system diagram illustrating an example of a database system 100 is depicted, in accordance with some example embodiments. In FIG. 1, the database system 100 may include one or more client devices 110, a database execution engine 130, and one or more databases 140. It is noted that the terms "database execution engine", "processor", and "processing logic" may be used interchangeably herein. Database 140 is shown as including table 150, which is representative of any number and type of database objects stored by database 140.

The one or more client devices 110, the database execution engine 130, and the one or more databases 140 may be communicatively coupled via a network 120. The one or more databases 140 may include a variety of relational databases including, for example, an in-memory database, a column-based database, a row-based database, and/or the like. The one or more client devices 110 may include processor-based devices including, for example, a mobile device, a wearable apparatus, a personal computer, a workstation, an Internet-of-Things (IoT) appliance, and/or the like. The network 120 may be a wired network and/or wireless network including, for example, a public land mobile network (PLMN), a local area network (LAN), a virtual local area network (VLAN), a wide area network (WAN), the Internet, and/or the like.

Figure 2:
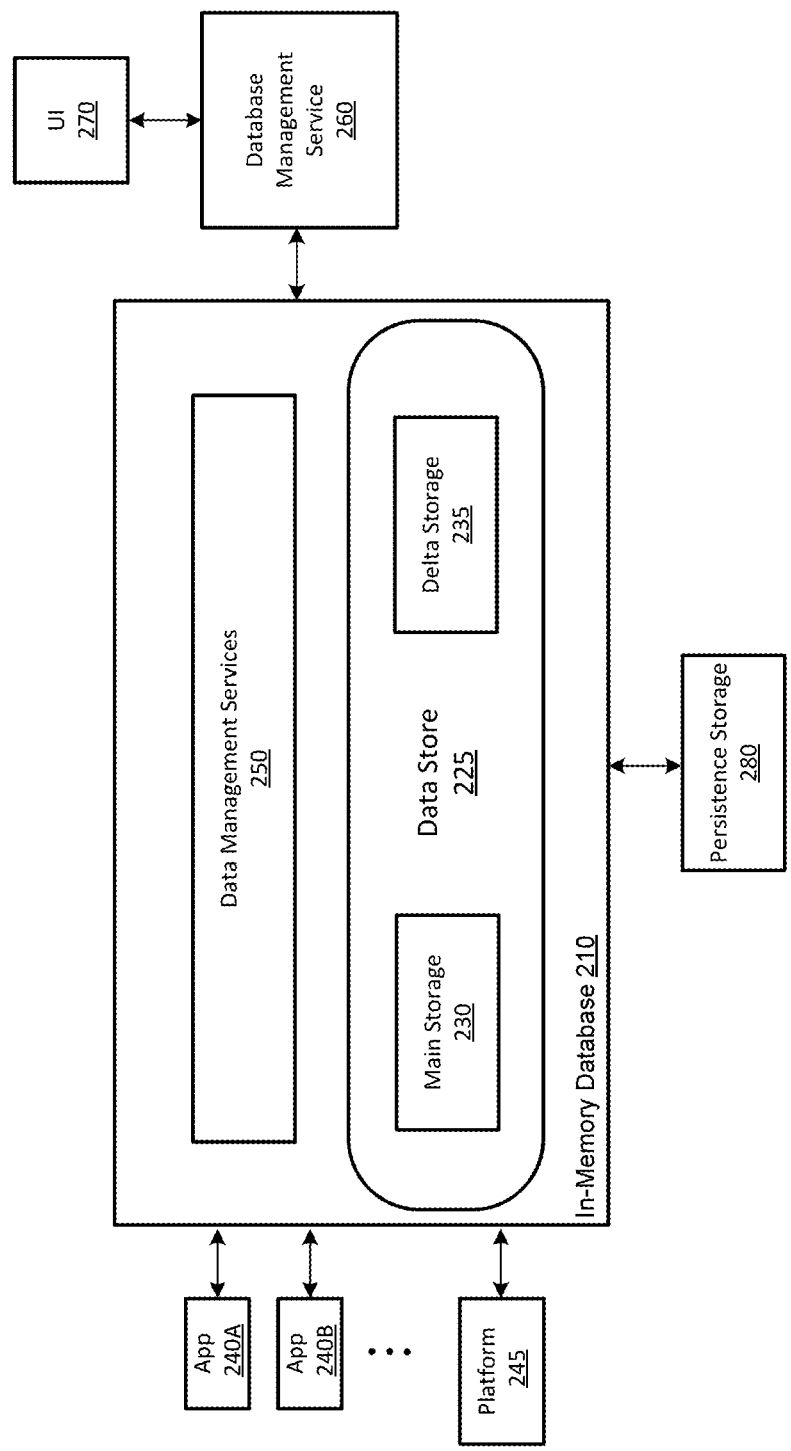
FIG. 2 illustrates another example of a system, in accordance with some example implementations of the current subject matter.

Turning now to FIG. 2, a diagram is depicted illustrating an example of a system 200 consistent with implementations of the current subject matter. System 200 includes applications 240A-B which interact with in-memory database 210. Applications 240A-B are representative of any number and type of applications executing within system 200. For example, applications 240A-N can include analytical services, transaction processing service, reporting services, dashboard services, and the like. Applications 240A-N interact with database 210 using structure queries or other expressions. System 200 also includes one or more platforms 245. In some embodiments, a given platform 245 can be a data warehousing service that exposes online analysis processing (OLAP) services to a user or application. The database management service 260 provides administration services and access to settings of the in-memory database 210. The user interface (UI) 270 mediates interactions between the database management service 260 and a user or application, for example, to configure the in-memory database 210 or set user preferences for sort operations.

Within the in-memory database 210, the data management services 250 manage transactions with the main storage 230 and the delta storage 235. The data management services 250 can provide a calculation and planning engine, modeling services, real-time replication services, data integration services, and/or other services. The main storage 230 supports fast read access to data of the database 210 in data store 225. A read operation accesses both the main storage 230 and delta storage 235, which includes any recently changed data that has not yet been incorporated into the main storage 230. The data in the main storage 230 may be backed up to persistence storage 280. Persistence storage 280 may be disk storage or other suitable type of memory device. The change data in the delta storage 235 is also backed up to persistence storage 280, so that changes survive events such as database failures, downtimes, and so on. In some embodiments, the persistence storage 280 stores database objects in a single unified persistence format regardless of the load unit of the objects. The unified persistence format will be described in more detail throughout the remainder of this disclosure. It should be understood that the example architecture of system 200 is merely indicative of what may be employed in some embodiments. In other embodiments, system 200 may be structured in other suitable manners with other arrangements of components.

Figure 3:
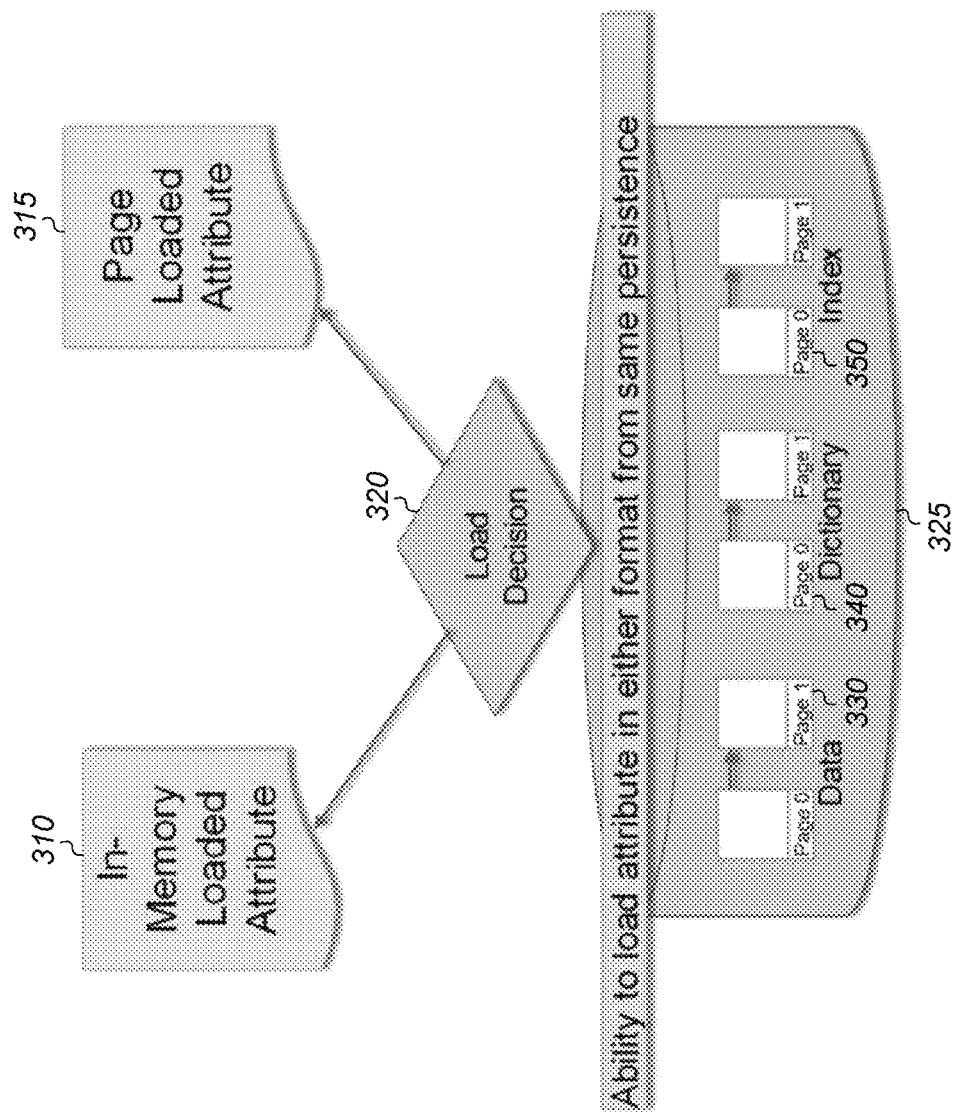
FIG. 3 illustrates an example of a load unit decision, in accordance with some example implementations of the current subject matter.

Referring now to FIG. 3, an example of implementing a load unit decision is shown. When a table (or other type of database object) is persisted into persistence store 325 using the unified persistence format, each column of the table has separate page chains for the data, dictionary, and index subcomponents. These are shown as the data page chain 330, dictionary page chain 340, and index page chain 350. When loading a portion of a table into memory from persistence store 325, a load unit decision 320 is made dynamically regarding the intended structure of the table in the in-memory store. If the load unit decision 320 is to use page loaded attribute 315 (i.e., a page-loadable load unit), then the table will be loaded into memory using the page-loadable format. The page-loadable format has a separate page chain for the data, dictionary, and index parts of the table. By having separate page chains for the data, dictionary, and index parts of the table, just the relevant pages can be loaded into memory rather than the entire column. If the load unit decision is to use in-memory loaded attribute 310, then the table will be loaded into memory using the column-loadable load unit, also referred to as an in-memory loaded format or a column-loadable format.

When the column of the table is loaded into memory using the column-loadable format, then the entirety of the data is read from persistence store 325, and the index vector, dictionary, and inverted index vector are created as in-memory structures. Once the data has been read from the persistence store 325 and the in-memory structures have been created, then the corresponding pages from the persistence store 325 are not accessed anymore. Using the in-memory index vector, a particular offset can be directly accessed in the in-memory store.

When the column of the table is loaded into memory using the page-loadable format, then only the relevant data is read from persistence store 325 and loaded into memory. In an example, in the page-loadable format, the processor first calculates in which page the offset lies, then that page is loaded, and then data is read from that page. Within that page, additional calculations may be needed from the header to get to the specific offset of a particular row.

Figure 4:
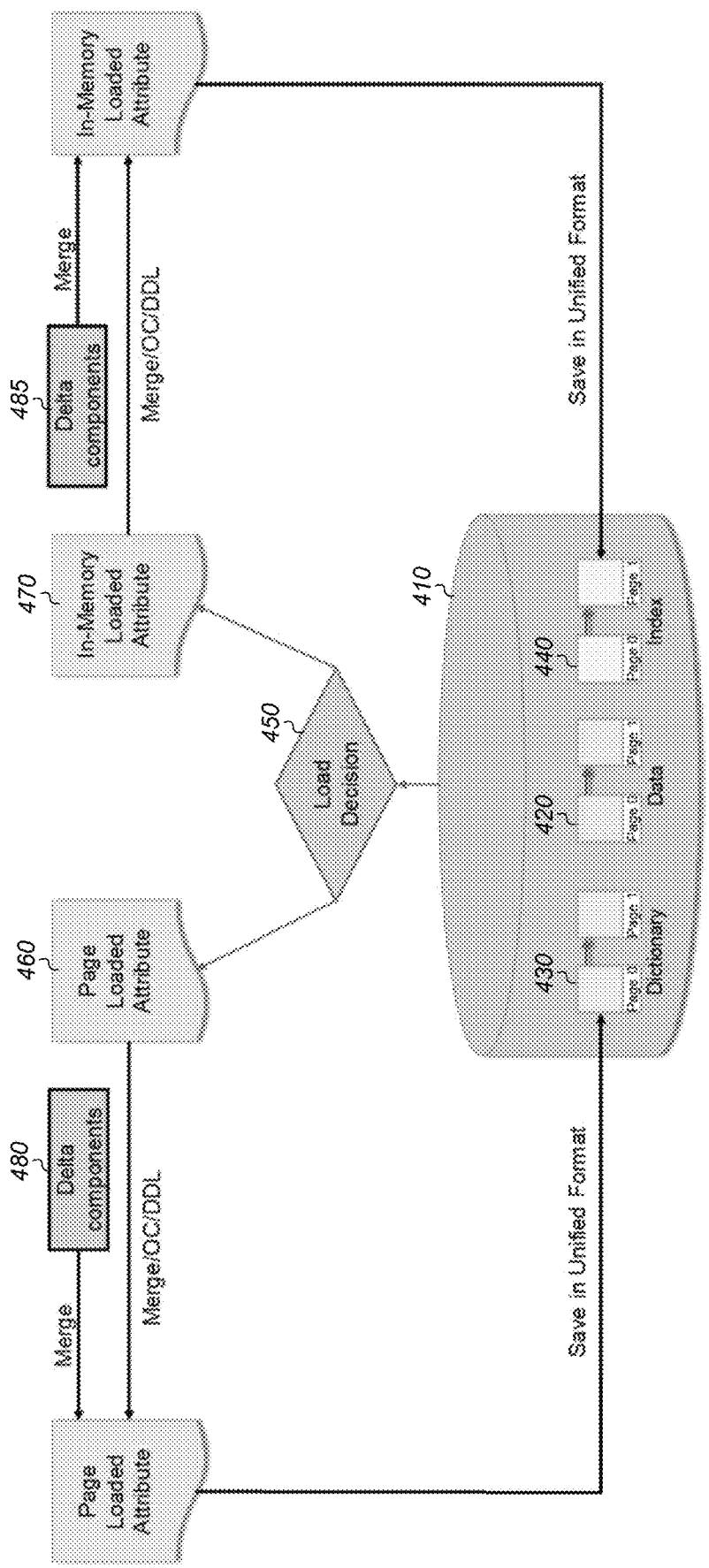
FIG. 4 illustrates another example of a load unit decision, in accordance with some example implementations of the current subject matter.

Turning now to FIG. 4, another example of implementing a load unit decision is shown. As illustrated in FIG. 4, persistence store 410 stores data in a unified persistence format. For tables stored in the unified persistence format, each component of each column (i.e., attribute) of the table has a separate page chain. For example, the data component is stored as data page chain 420, the dictionary component is stored as dictionary page chain 430, and the index component is stored as index page chain 440.

When a given portion of the table needs to be loaded into the in-memory store from persistence store 410, a load decision 450 will be made to determine in what format the given portion will be stored in memory. In an example, the determination of which format to load the given portion in-memory is based at least on an attribute associated with the table portion. For example, the attribute may be a page-loaded attribute 460 or the attribute may be an in-memory loaded attribute 470. In another example, the determination of which format to load the given portion in-memory is also based on real-time operating conditions (e.g., memory utilization, how frequently the table is accessed). If the real-time operation conditions indicate that a load unit conversion should not be performed, based on memory utilization, frequency of access, and other factors, then the load decision 450 can default back to the attribute associated with the table. For queries referencing a column with a page-loaded attribute 460, if a load unit conversion is not implemented, then the data is loaded into memory in the page-loadable format. For queries referencing a column with an in-memory loaded attribute 470, if a load unit conversion is not implemented, then the data is loaded into memory in the column-loadable format.

If a load unit conversion is implemented, then a column with a page-loaded attribute 460 is loaded in column-loadable format into the in-memory store. Or, if the column has an in-memory loaded attribute 470 and a load unit conversion is implemented, then the column is loaded in page-loadable format into the in-memory store. In an example, the load unit conversion may be implemented if memory utilization is below a threshold by converting a page-loadable load unit into a column-loadable load unit. Alternatively, or additionally, the load unit conversion may be implemented if memory utilization is above a threshold by converting a column-loadable load unit into a page-loadable load unit. Alternatively, or additionally, the load unit conversion may be implemented if the access frequency of the column is above a threshold by converting a page-loadable load unit into a column-loadable load unit. Alternatively, or additionally, the load unit conversion may be implemented if the access frequency of the column is below a threshold by converting a column-loadable load unit into a page-loadable load unit. Other conditions for performing a load unit conversion are possible and are contemplated.

Once a table is loaded into the in-memory store, when changes are made to the table in the page-loadable format, the delta components 480 are merged with the unchanged data and saved back into persistence store 410 in the unified persistence format. Similarly, when changes are made to a table in the column-loadable format in the in-memory store, the delta components 485 are merged with the unchanged data and saved back into persistence store 410 in the unified persistence format. In other words, in this example, regardless of which load unit is used for loading a table into memory, the changed data will be merged back and stored in the unified persistence format in persistence store 410.

Figure 5:
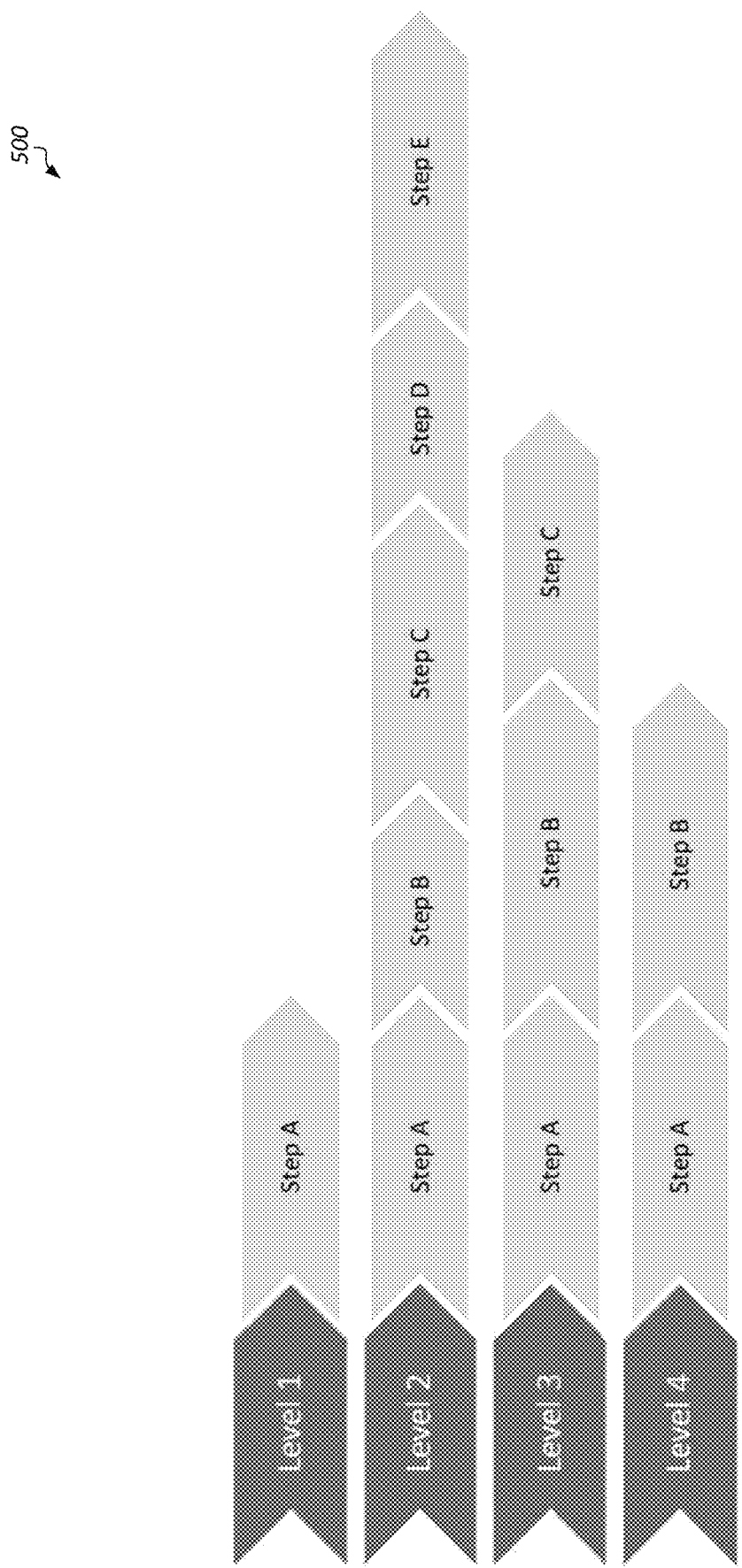
FIG. 5 illustrates a logical diagram of a metadata maintenance process 500 when performing a load unit conversion, in accordance with some example implementations of the current subject matter.

Referring now to FIG. 5, a logical diagram of a metadata maintenance process 500 when performing a load unit conversion is shown. When a load unit conversion is performed, metadata maintenance process 500 may be implemented. Metadata maintenance process 500 may include steps at multiple levels for a given database object that is persisted in the unified persistence format. The unified persistence format indicates that the persistence format is the same for column-loadable and page-loadable database objects. Each level of metadata maintenance process 500 may correspond to a separate engine that is creating, copying, or altering metadata and/or other structures associated with the given database object.

While four levels are shown in FIG. 5, with a certain number of steps specified for each level, it should be understood that this is merely one non-limiting example of a metadata maintenance process. In other implementations, metadata maintenance process 500 may include other numbers of levels with other numbers of steps per level. It is noted that metadata maintenance process 500 may also be referred to as a metadata generation process or a metadata creation process.

At level 1, step A of the load unit conversion, the catalog metadata associated with the given database object is updated. The catalog metadata defines the load unit for a column, partition, or table. Next, the conversion moves to step A of level 2, where the metadata in the column descriptor is updated with the relevant flags. Then, in step B of level 2, a determination is made on a per-component level of whether the component's persistent page chains can be shared. Next, in step C of level 2, a new column fragment object version is created for the given database object undergoing the load unit conversion. Then, in step D of level 2, persistent page chains are shared for those components which were selected according to the determination decision of step B of level 2. Next, in step E of level 2, the in-memory column fragment is populated.

Moving on to level 3 of the load unit conversion for the given database object, a new attribute value container is created in step A of level 3 using the newer version of the column fragment object which was created in step C of level 2. The new attribute value container is the in-memory representation of the newer version of the column fragment object. Next, in step B of level 3, the attribute engine copies data from the source to the target but skips copying for those components which share the persistent page chain. Then, in step C of level 3, the new attribute value container is saved.

Moving on to level 4 of the load unit conversion for the given database object, the new column fragment object is made visible in step A of level 4. This makes the new attribute value container visible to the next query so that the new attribute value container can be used by the next load thread. Then, in step B of level 4, the attribute store is updated for the new column fragment object.

Figure 6:
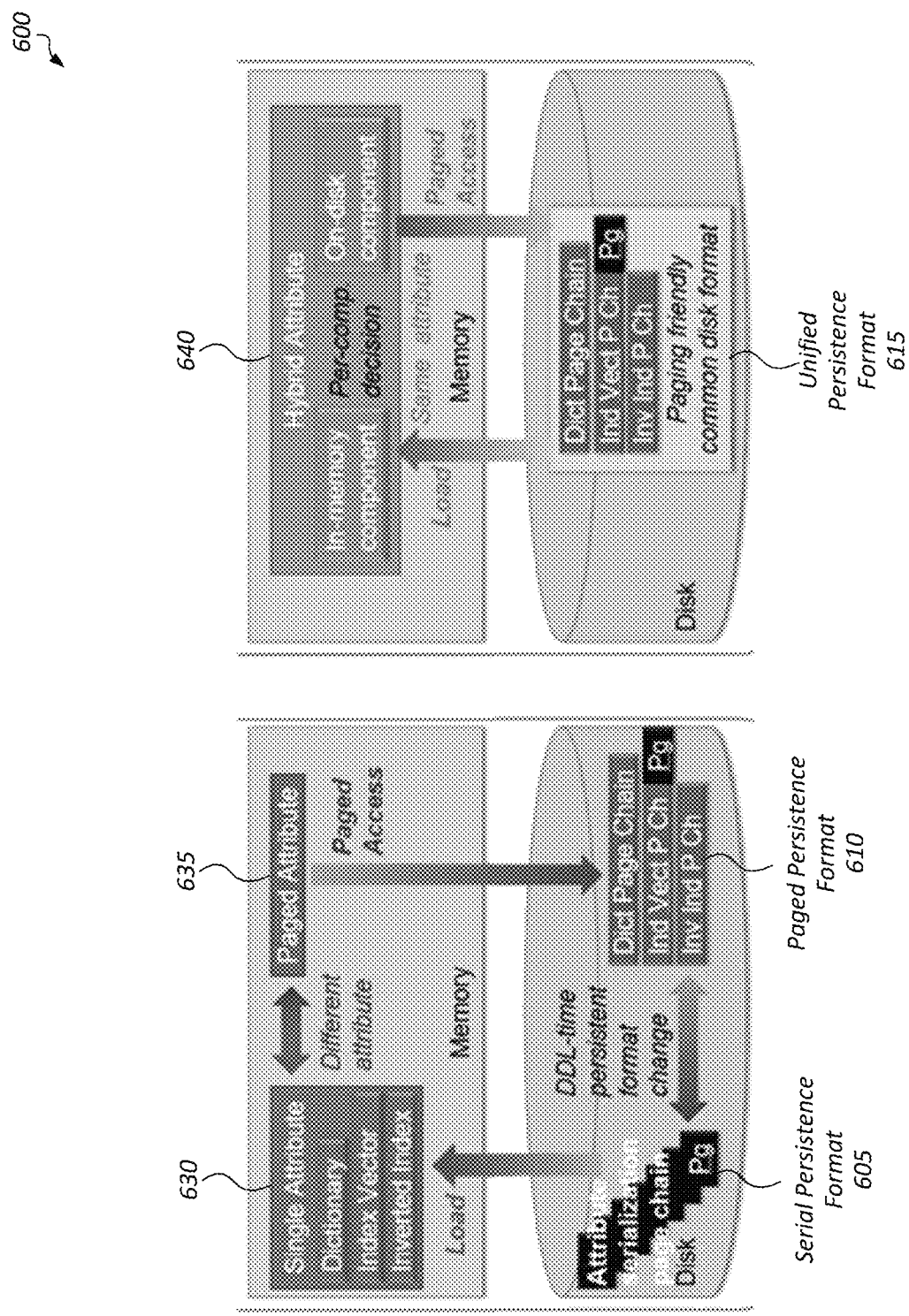
FIG. 6 illustrates a diagram of different persistence formats, in accordance with some example implementations of the current subject matter.

Turning now to FIG. 6, a diagram 600 of different persistence formats is shown. In an example shown on the left-side of FIG. 6, a column-loadable database object is stored as a serial page chain in serial persistence format 605, with a single attribute 630 in the in-memory store. For page-loadable database objects having an in-memory paged attribute 635, there are separate page chains for each component in the paged persistence format 610. In an example, the database object components include the dictionary, inverted index, and data page chains. On the left-side of FIG.

6, when converting between the column loadable and page loadable formats, the persistence is rewritten.

However, on the right-side of FIG. 6, with database objects persisted according to the unified persistence format 615, the persistence does not need to be rewritten when performing a load unit conversion. For a database stored in persistence storage according to unified persistence format 615, metadata associated with the database object undergoing the load unit conversion is uploaded to the in-memory store. This uploading of metadata allows the load unit conversion to occur without having to rewrite the persistence. The in-memory database object has a hybrid attribute 640 which is the same attribute for either a column-loadable or a page-loadable database object.

Figure 7:
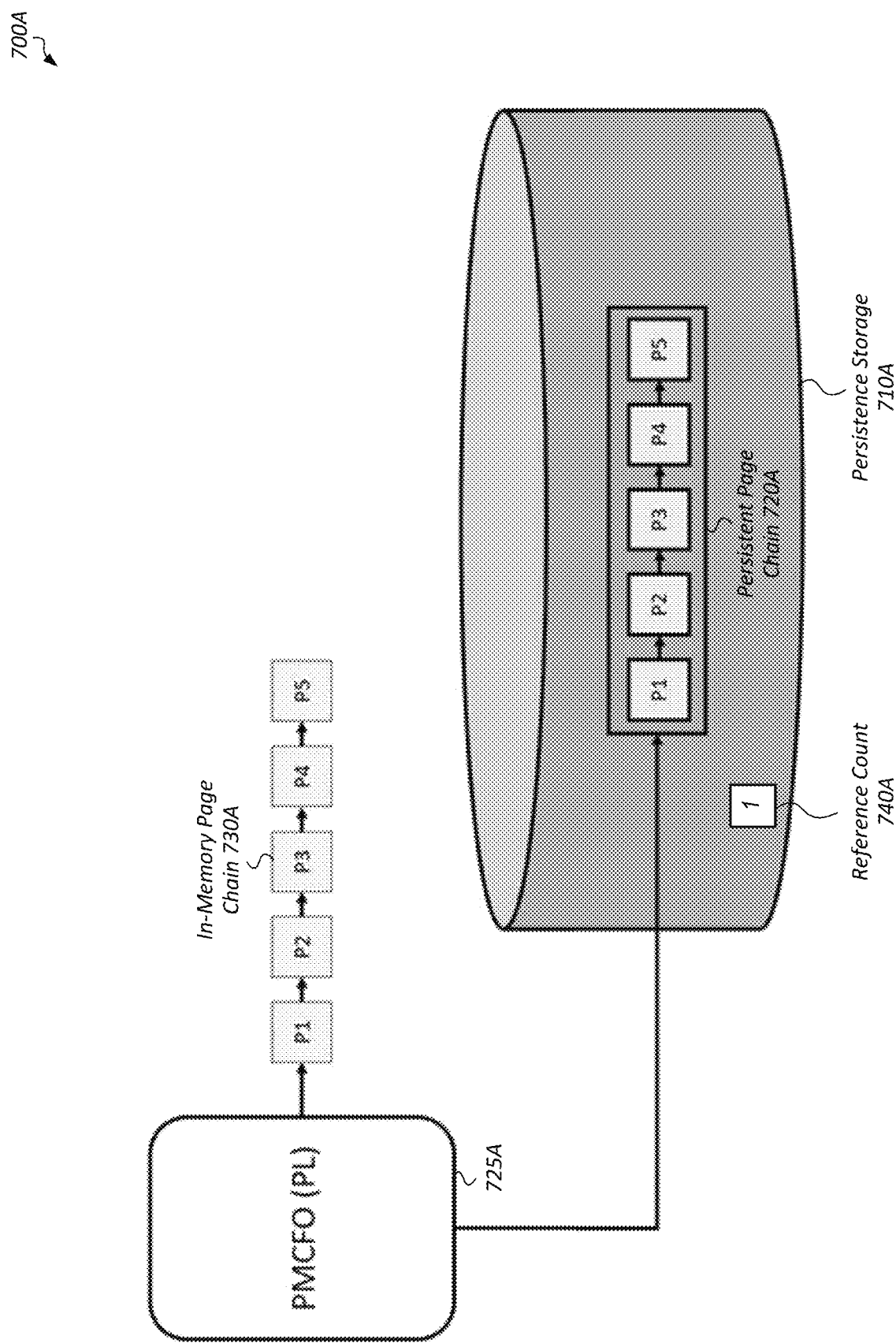
FIG. 7 illustrates a diagram of a database implementing page chain sharing, in accordance with some example implementations of the current subject matter.

Referring now to FIG. 7, a diagram of a database 700A implementing page chain sharing in accordance with the current subject matter is shown. As shown, a database object formatted according to the unified persistence format in persistence storage 710A has a persistent page chain 720A. When the database object is loaded into memory, a page main column fragment object (PMCFO) 725A is created in-memory with a page-loadable (PL) format, with PMCFO 725A including an in-memory page chain 730A. PMCFO 725A represents the main fragment of the column fragment, which is an in-memory representation in the page-loadable format. When the in-memory representation of PMCFO 725A is created, the reference count 740A, associated with the persistent page chain 720A, is set to one.

Figure 8:
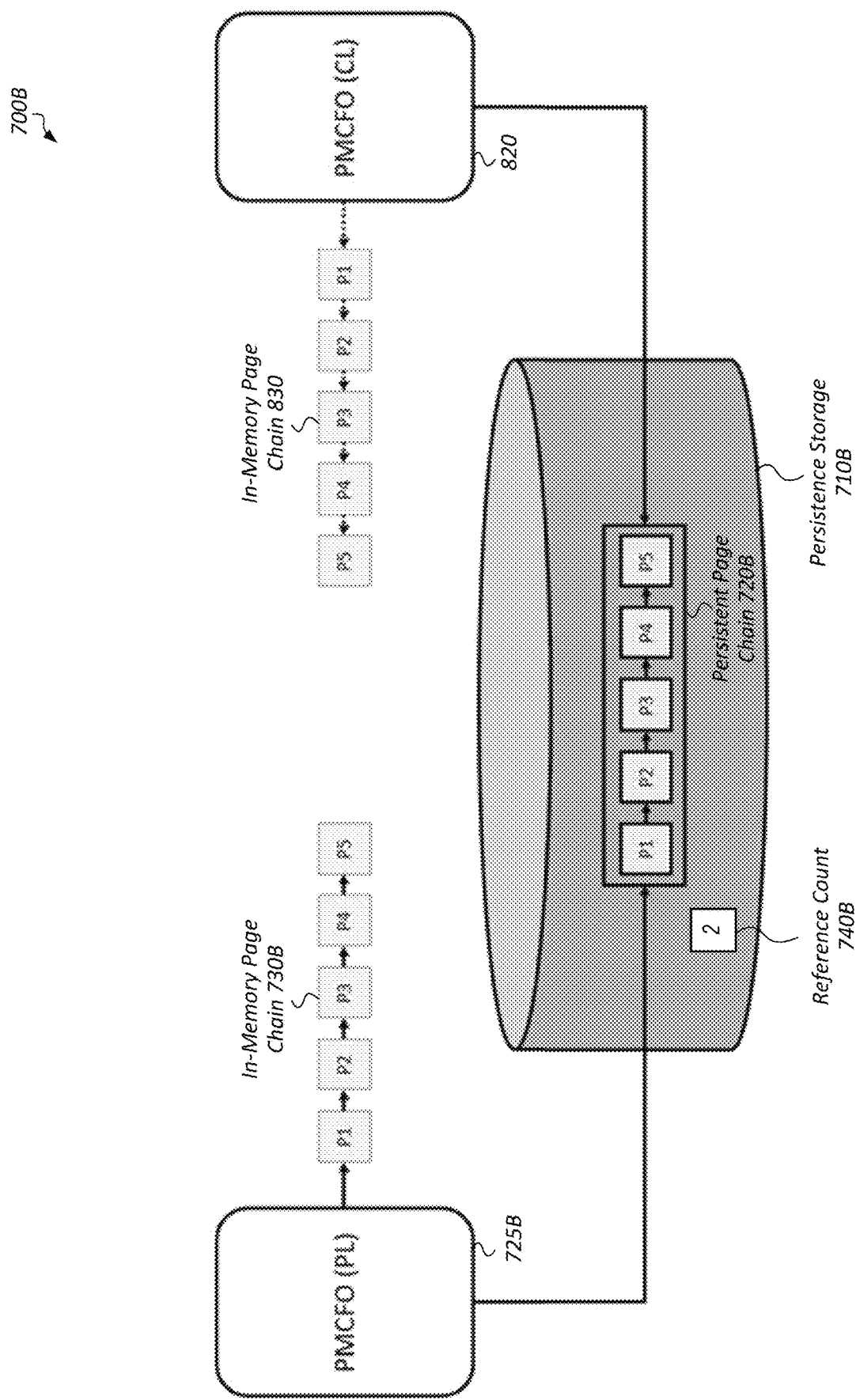
FIG. 8 illustrates a diagram of a database implementing page chain sharing, in accordance with some example implementations of the current subject matter.

Turning now to FIG. 8, a diagram of database 700B implementing page chain sharing in accordance with the current subject matter is shown. Database 700B is intended to represent database 700A (of FIG. 7) but at a later point in time. Similarly, PMCFO 725B, persistence storage 710B, persistent page chain 720B, and reference count 740B represent PMCFO 725A, persistence storage 710A, persistent page chain 720A, and reference count 740A, respectively, at a later point in time. At the point in time represented in FIG. 8, a new column fragment object has been created, shown as PMCFO 820. In this case, PMCFO 820 is in the column-loadable (CL) format. When the in-memory page chain 830 for PMCFO 820 is created, in-memory page chain 830 points to persistent page chain 720B. This results in the reference count 740b for persistent page chain 720b being increased to two. This illustrates the concept of sharing of unified persistence format page chains across column fragments which is possible when doing a conversion from the page-loadable format to the column-loadable format or from the column-loadable format to the page-loadable format. The conversion occurs without performing a rewrite of the persistence since the persistence is the same for both page-loadable PMCFO 725B and column-loadable PMCFO 820. When the reference count goes down to zero for a given page chain, then the database object may be removed from persistence storage 710B. Otherwise, if reference count 740B stays above zero, then the database object is preserved.

Figure 9:
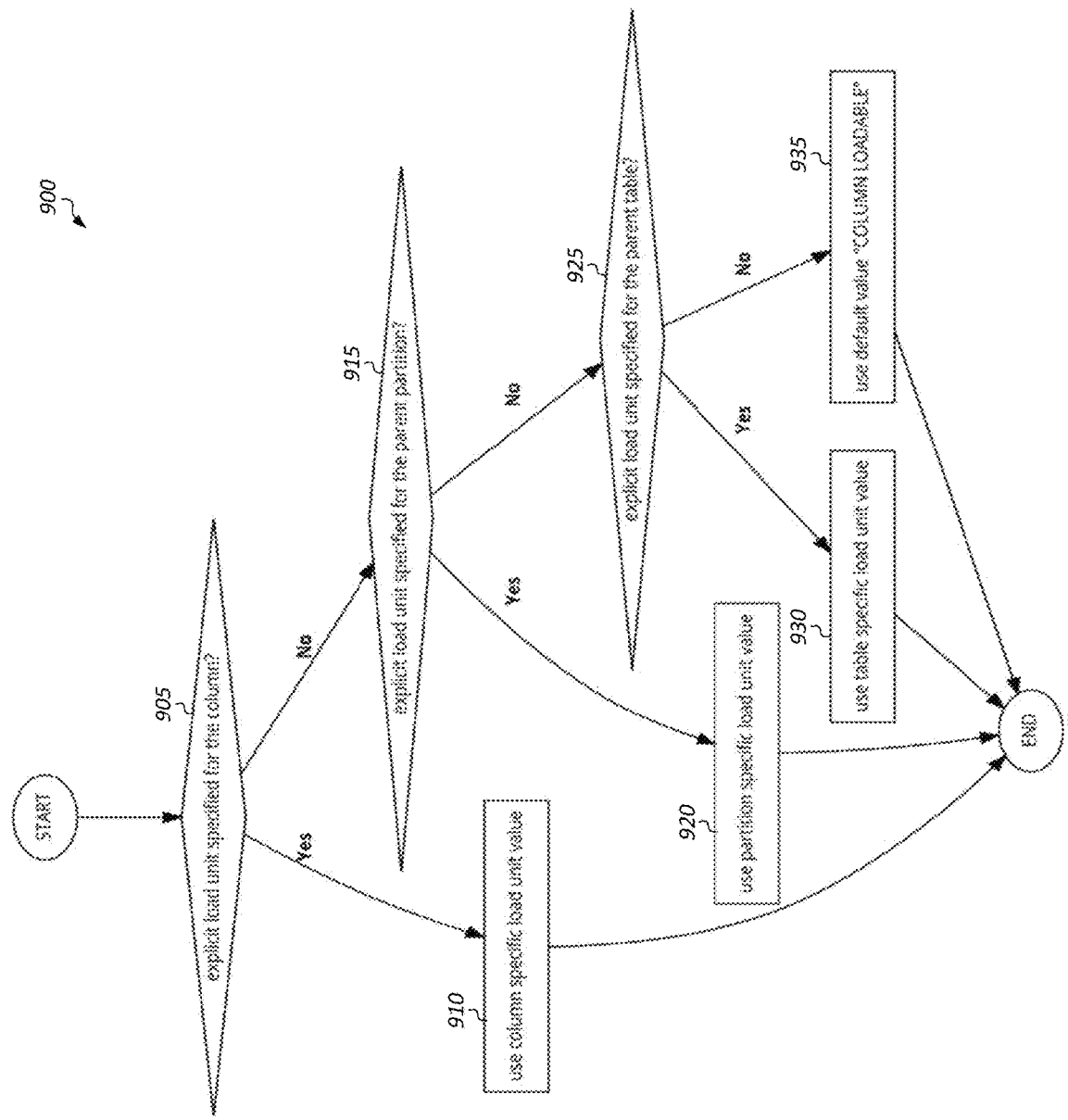
FIG. 9 illustrates an example of a process for determining a load unit when bringing a database object or a database object subcomponent into memory, in accordance with some example implementations of the current subject matter.

Referring now to FIG. 9, a process 900 is depicted for determining a load unit when bringing a database object or a database object subcomponent into memory. When loading a column into memory, a database determines if there is an explicit load unit specified for the column (conditional block 905). If there is an explicit load unit specified for the column (conditional block 905, "yes" leg), then the database uses the column specific load unit value when loading the column into memory (block 910). After block 910, method 900 may end. If there is not an explicit load unit specified for the column (conditional block 905, "no" leg), then the database determines if there is an explicit load unit specified for the parent partition (conditional block 915). If there is an explicit load unit specified for the parent partition (conditional block 915, "yes" leg), then the database uses the partition specific load unit value for the column when loading the column into memory (block 920). After block 920, method 900 may end. If there is not an explicit load unit specified for the parent partition (conditional block 915, "no" leg), then the database determines if there is an explicit load unit specified for the parent table (conditional block 925).

If there is an explicit load unit specified for the parent table (conditional block 925, "yes" leg), then the database uses the table specific load unit value for the column when loading the column into memory (block 930). After block 930, method 900 may end. If there is not an explicit load unit specified for the parent table (conditional block 925, "no" leg), then the database uses the default column-loadable format for the column when loading the column into memory (block 935). After block 935, method 900 may end.

Figure 10:
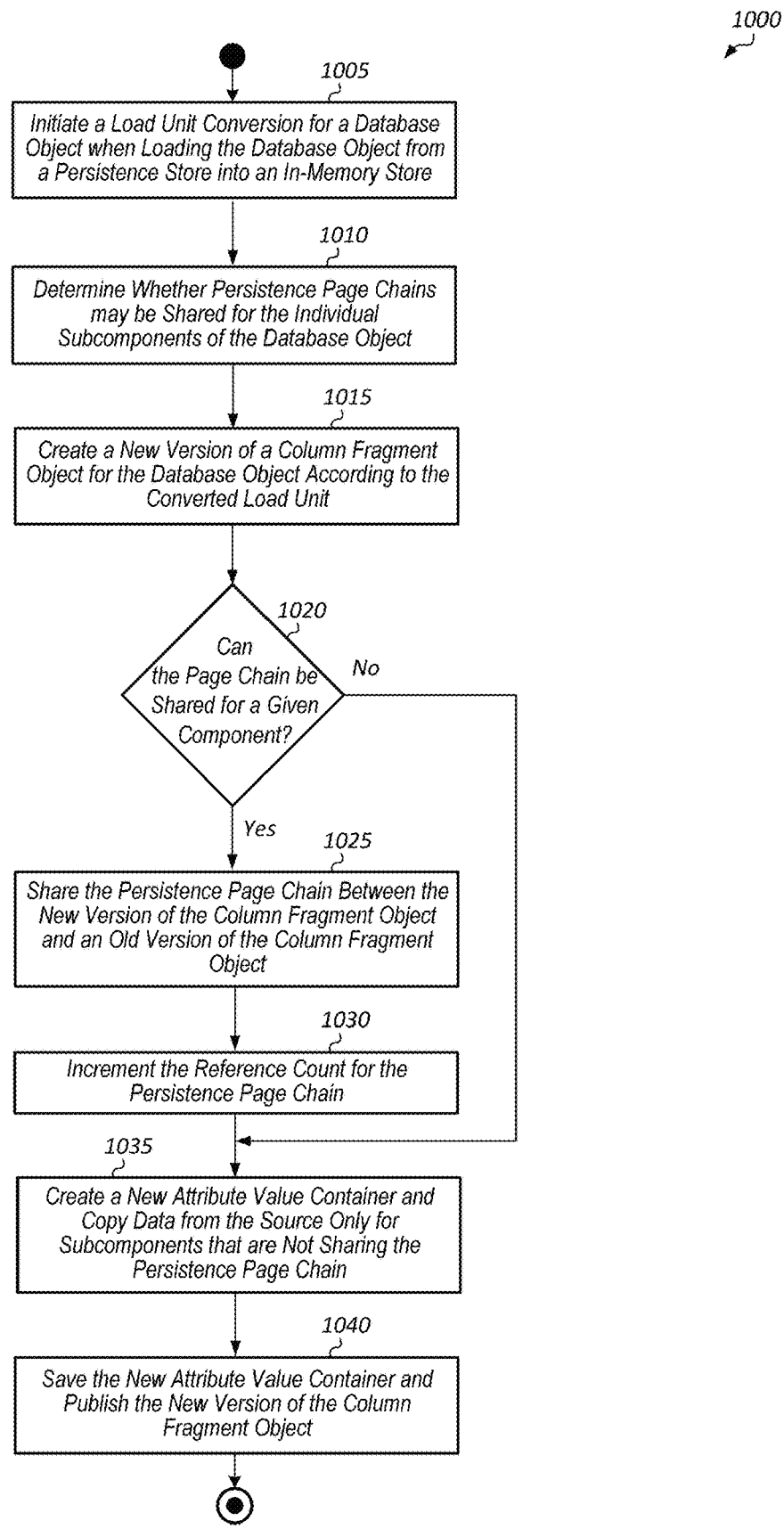
FIG. 10 illustrates an example of a process for performing a load unit conversion when loading a database object from a persistence store into an in-memory store, in accordance with some example implementations of the current subject matter.

Turning now to FIG. 10, a process 1000 is depicted for performing a load unit conversion when loading a database object from a persistence store into an in-memory store. A database system initiates a load unit conversion for a database object when loading the database object from a persistence store into an in-memory store (block 1005). In response to initiating the load unit conversion, the database system determines whether persistence page chains may be shared for the individual subcomponents (e.g., data, dictionary, inverted index) of the database object (block 1010). In an example, if the database object is stored in the unified persistence format in the persistence store, then the persistence page chains may be shared for the individual subcomponents. In another example, if the compression scheme used to compress a given individual subcomponent is compatible between the persistence store and the in-memory store, then the persistence page chain may be shared for the given individual subcomponent. It should be understood that these are non-limiting examples, and alternatives to the above, such as other conditions being checked before persistence page chain sharing is enabled, are possible and are contemplated.

Next, a new version of a column fragment object for the database object is created according to the converted load unit (block 1015). If the persistence page chain can be shared for a given subcomponent of the database object (conditional block 1020, "yes" leg), then the persistence page chain is shared between the new version of the column fragment object and an old version of the column fragment object (block 1025). Also, the reference count for the persistence page chain is incremented (block 1030). If the persistence page chain cannot be shared for a given subcomponent of the database object (conditional block 1020, "no" leg), then a new attribute value container is created and data is copied from the source only for subcomponents that are not sharing the persistence page chain (block 1035). The new attribute value container is saved and the new version of the column fragment object is published (i.e., made visible) (block 1040). Being published makes the new attribute value container visible to the next query so that the new attribute value container can be used by the next load thread. After block 1040, method 1000 ends.

Figure 11:
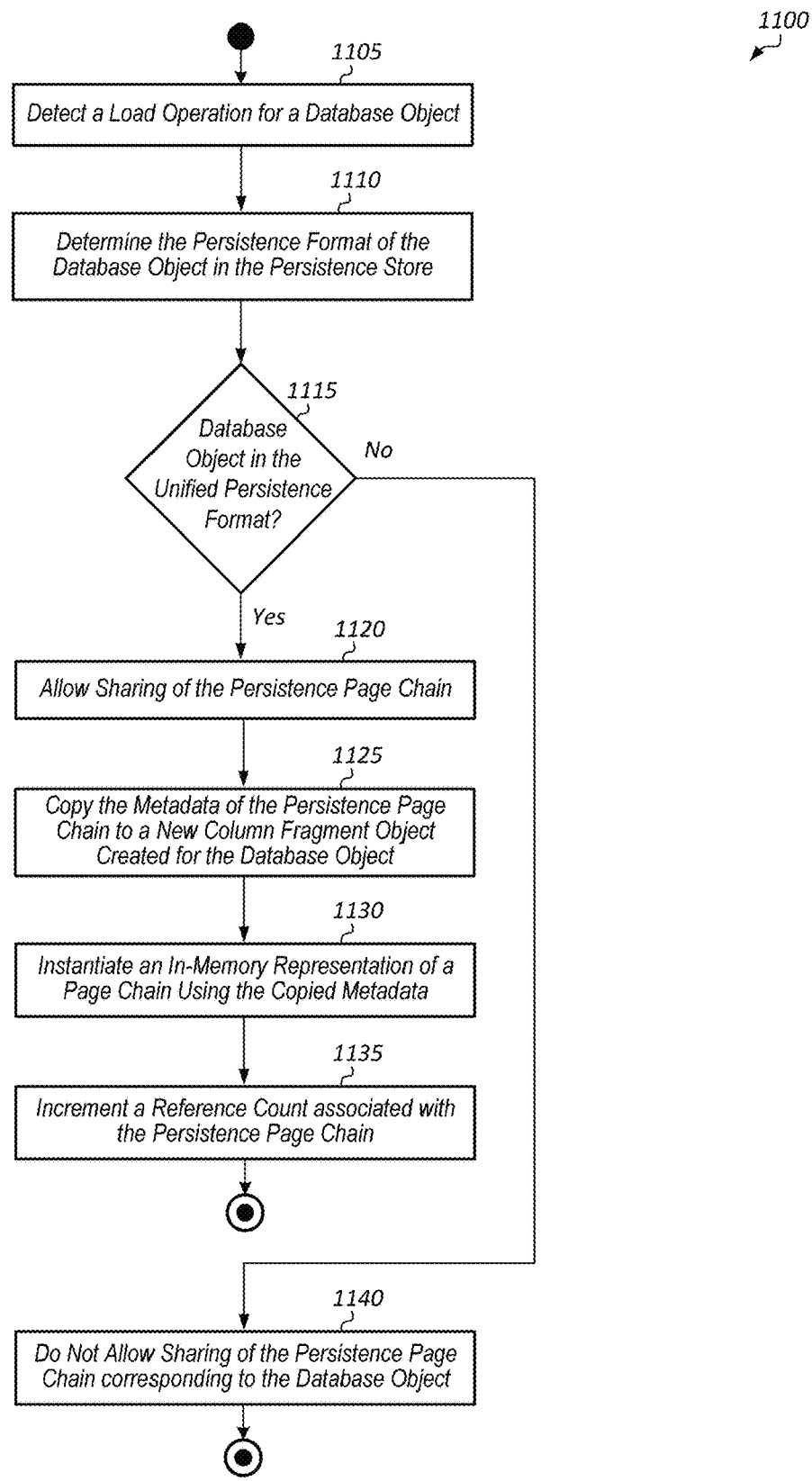
FIG. 11 illustrates an example of a process for determining whether to allow sharing of a persistence page chain, in accordance with some example implementations of the current subject matter.

Referring now to FIG. 11, a process 1100 is depicted for determining whether to allow sharing of a persistence page chain. A database system detects a load operation for a database object (block 1105). The database system determines the persistence format of the database object in the persistence store (block 1110). If the database object is formatted in accordance with the unified persistence format in the persistence store (conditional block 1115, "yes" leg), then the database system allows sharing of the persistence page chain corresponding to the database object (block 1120). Next, since sharing of the persistence page chain is allowed, the metadata of the persistence page chain is copied to a new column fragment object created for the database object (block 1125). The metadata may include information such as the starting address of the persistence page chain in the persistence store, the ending address of the persistence page chain in the persistence store, and so on. Then, an in-memory representation of a page chain is instantiated using the copied metadata (block 1130). Next, a reference count associated with the persistence page chain is incremented (block 1135).

By allowing the sharing of persistence page chain corresponding to the database object, multiple column fragment objects stored in different formats in the in-memory store may point to (i.e., reference) the persistence page chain. This allows for load unit conversion when loading the database object into the in-memory store without requiring a rewrite of the persistence format of the database object stored in the persistence store. After block 1135, method 1100 may end. If the database object is formatted in accordance with the serial persistence format or the paged persistence format in the persistence store (conditional block 1115, "no" leg), then the database system does not allow for sharing of the persistence page chain corresponding to the database object (block 1140). After block 1140, method 1100 may end.

Figure 12:
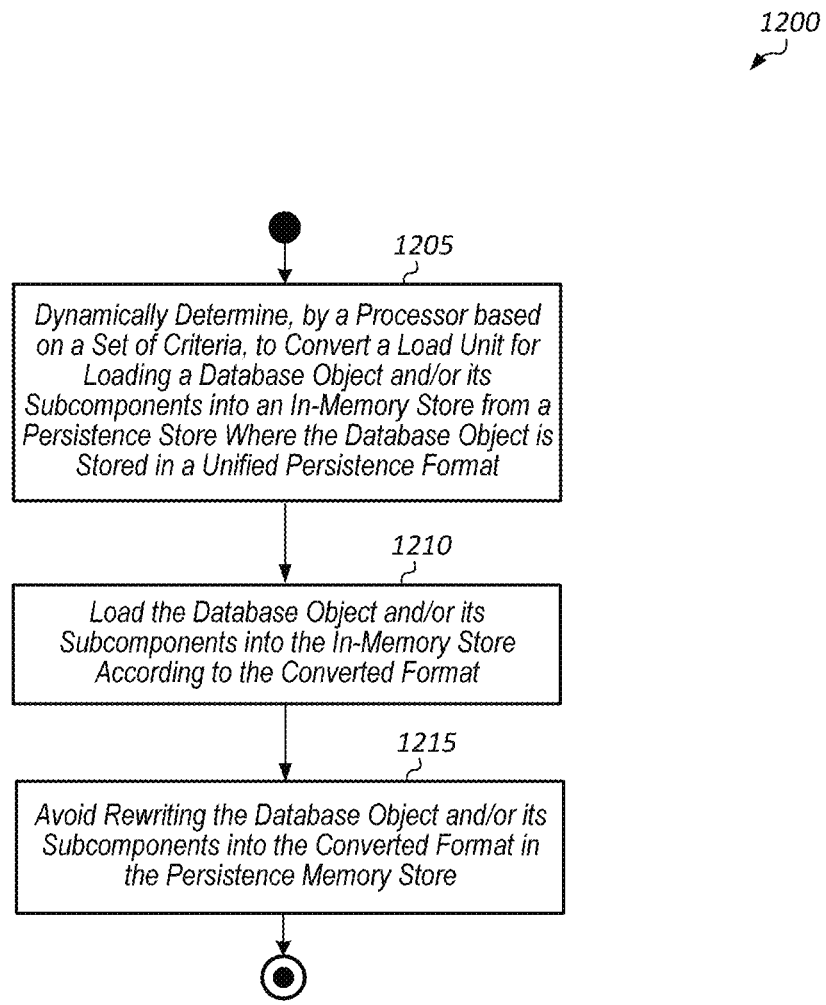
FIG. 12 illustrates an example of a process for dynamically determining load units for bringing database objects and/or database object subcomponents into memory, in accordance with some example implementations of the current subject matter.

Turning now to FIG. 12, a process is depicted for dynamically determining load units for bringing database objects and/or database object subcomponents into memory. A processor dynamically determines, based on a set of criteria, to convert a load unit for loading a database object (e.g., a database column) and/or subcomponents (e.g., data vector, dictionary, index) of the database object into an in-memory store from a persistence store where the database object is stored in a unified persistence format (block 1205). In other words, the processor dynamically determines to convert the load unit at runtime in block 1205. The load unit of the database object may be specified according to a data description language (DDL) statement associated with the database object, by way of non-limiting example. If the DDL statement specifies a first type of load unit for the database object, then in this example, the processor would convert the first type of load unit to a second type of load unit different from the first type of load unit in block 1205.

Depending on the embodiment, the set of criteria can include various parameters such as a load unit definition, application usage of the data, memory utilization, frequency of usage of the data, and so on. One or more of the parameters may take precedence or have more weight in some embodiments. For example, if a first condition is met, such as the memory utilization being above a first threshold, then the conversion may take place. In another example, if two conditions are met, such as the aforementioned first condition and a second condition of the frequency of access to the data being below a second threshold, then the conversion may take place. Alternatives with other numbers and types of conditions are possible and are contemplated. In other embodiments, each parameter factors in equally, or substantially equally, with the other parameters in the determination of which load unit to use for loading the database object and/or its subcomponents.

In response to dynamically determining to convert the load unit for bringing the database objects and/or its subcomponents into memory, the processor loads the database object and/or its subcomponents into the in-memory store according to the converted format (block 1210). Also, since the database object is stored in the unified persistence format in the persistence store, the processor avoids rewriting the database object and/or its subcomponents into the converted format in the persistence store (block 1215). In other words, in block 1215, the persistence store copy of the database object can remain the same, avoiding a time-consuming rewrite of the data, which is especially advantageous for database objects of relatively large size. After block 1215, method 1200 ends.

Figure 13:
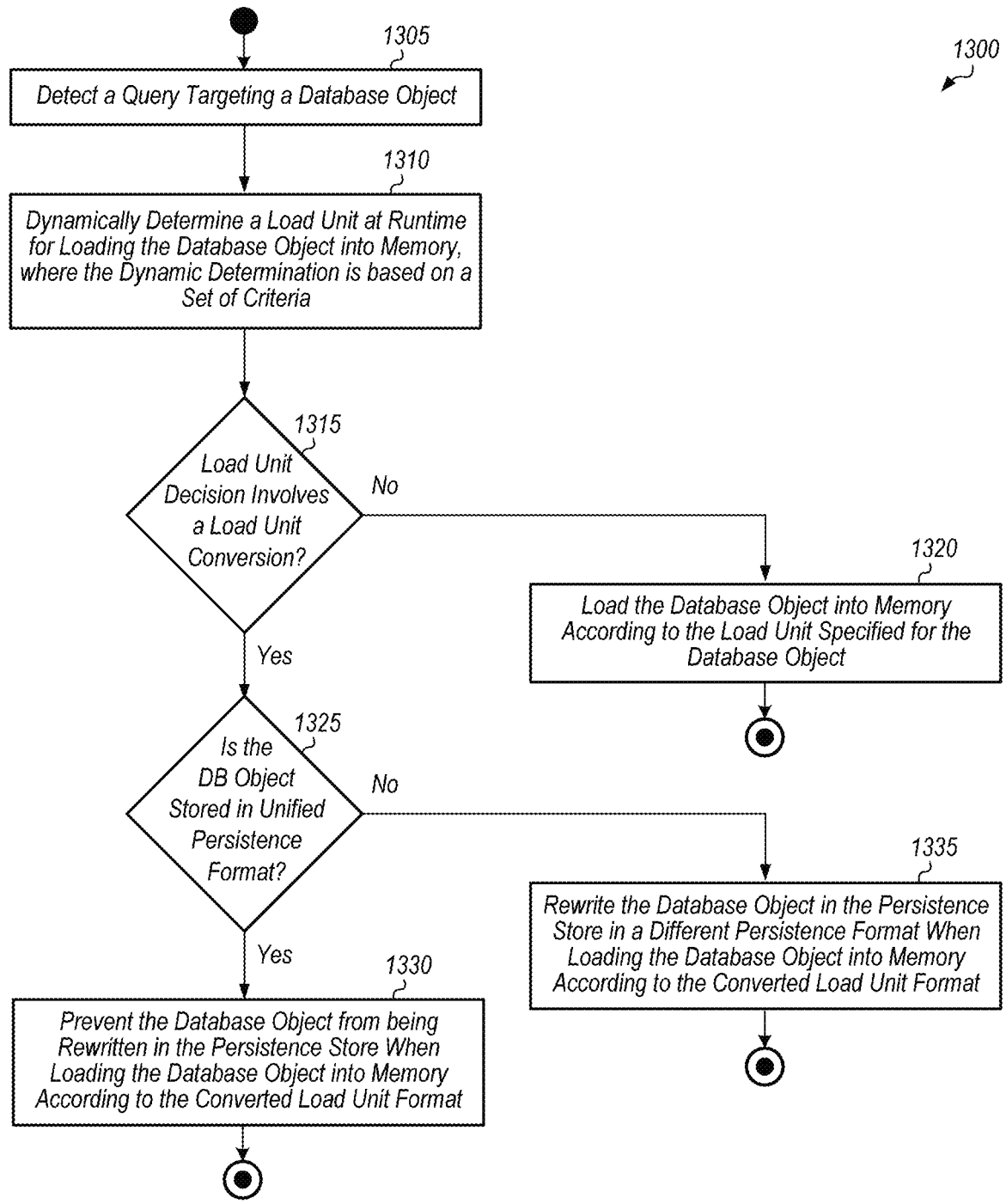
FIG. 13 illustrates an example of a process for dynamically making a load unit decision at runtime, in accordance with some example implementations of the current subject matter.

Referring now to FIG. 13, a flow diagram illustrating a process for dynamically making a load unit decision at runtime is shown. A processor detects a query targeting a database object (block 1305). The processor dynamically determines a load unit at runtime for loading the database object into memory, where the dynamic determination is based on a set of criteria (block 1310). In various embodiments, the set of criteria may include workload statistics, application usage of the database object, access frequency, memory utilization, size of the database object, size of each subcomponent, and/or other criteria. If the load unit decision involves a load unit conversion (i.e., converting a first load unit to a second load unit) (conditional block 1315, "yes" leg), and if the database (DB) object is stored in the unified persistence format in a persistence store (conditional block 1325, "yes" leg), then the processor prevents the database object in the persistence store from being rewritten when loading the database object into memory according to the converted load unit format (block 1330). In other words, the database object formatted according to the unified persistence format in the persistence store remains unchanged in block 1330. After block 1330, method 1300 ends. If the load unit decision does not involve a load unit conversion (conditional block 1315, "no" leg), then the processor loads the database object into memory according to the load unit specified for the database object (block 1320). After block 1320, method 1300 ends.

If the load unit decision involves a load unit conversion (conditional block 1315, "yes" leg), and if the database object is not stored in the unified persistence format in the persistence store (conditional block 1325, "no" leg), then the processor rewrites the database object in the persistence store in a different persistence format when loading the database object into memory according to the converted load unit format (block 1335). After block 1335, method 1300 ends. It should be understood that while method 1300 is described with respect to a database object, the steps of method 1300 may be applied, alternatively or additionally, to one or more subcomponents of the database object.

Figure 14A:
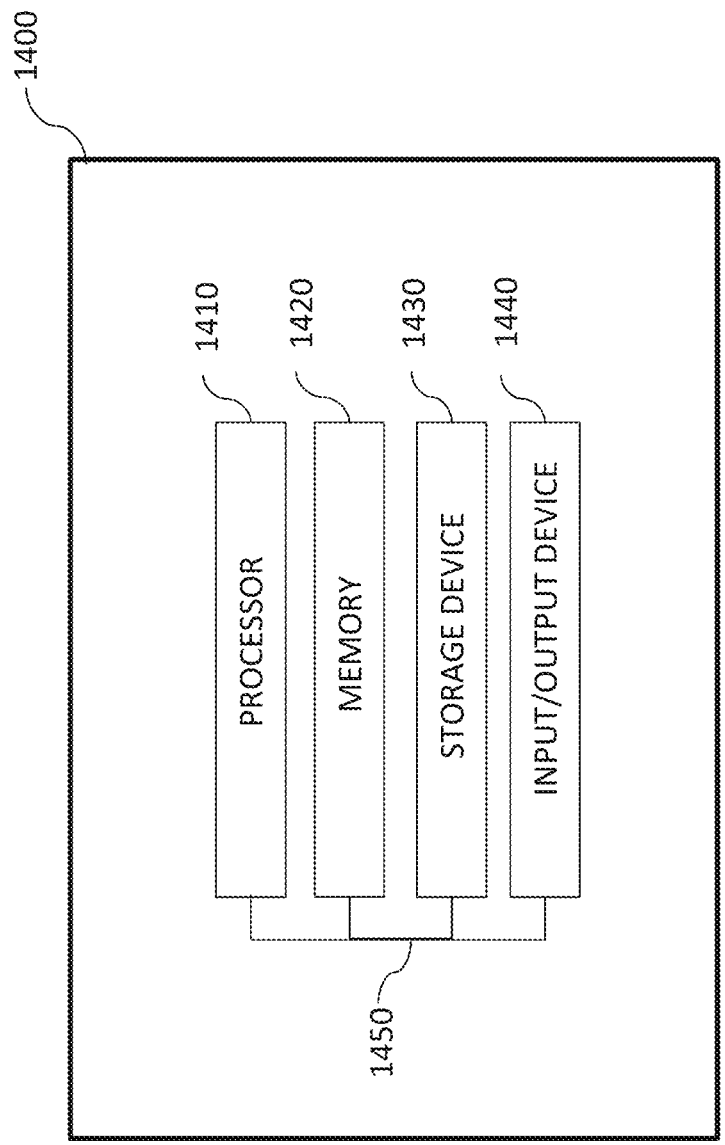
FIG. 14A depicts an example of a system, in accordance with some example implementations of the current subject matter.

In some implementations, the current subject matter may be configured to be implemented in a system 1400, as shown in FIG. 14A. The system 1400 may include a processor 1410, a memory 1420, a storage device 1430, and an input/output device 1440. Each of the components 1410, 1420, 1430 and 1440 may be interconnected using a system bus 1450. The processor 1410 may be configured to process instructions for execution within the system 1400. In some implementations, the processor 1410 may be a single-threaded processor. In alternate implementations, the processor 1410 may be a multi-threaded processor. The processor 1410 may be further configured to process instructions stored in the memory 1420 or on the storage device 1430, including receiving or sending information through the input/output device 1440. The memory 1420 may store information within the system 1400. In some implementations, the memory 1420 may be a computer-readable medium. In alternate implementations, the memory 1420 may be a volatile memory unit. In yet some implementations, the memory 1420 may be a non-volatile memory unit. The storage device 1430 may be capable of providing mass storage for the system 1400. In some implementations, the storage device 1430 may be a computer-readable medium. In alternate implementations, the storage device 1430 may be a floppy disk device, a hard disk device, an optical disk device, a tape device, non-volatile solid state memory, or any other type of storage device. The input/output device 1440 may be configured to provide input/output operations for the system 1400. In some implementations, the input/output device 1440 may include a keyboard and/or pointing device. In alternate implementations, the input/output device 1440 may include a display unit for displaying graphical user interfaces.

Figure 14B:
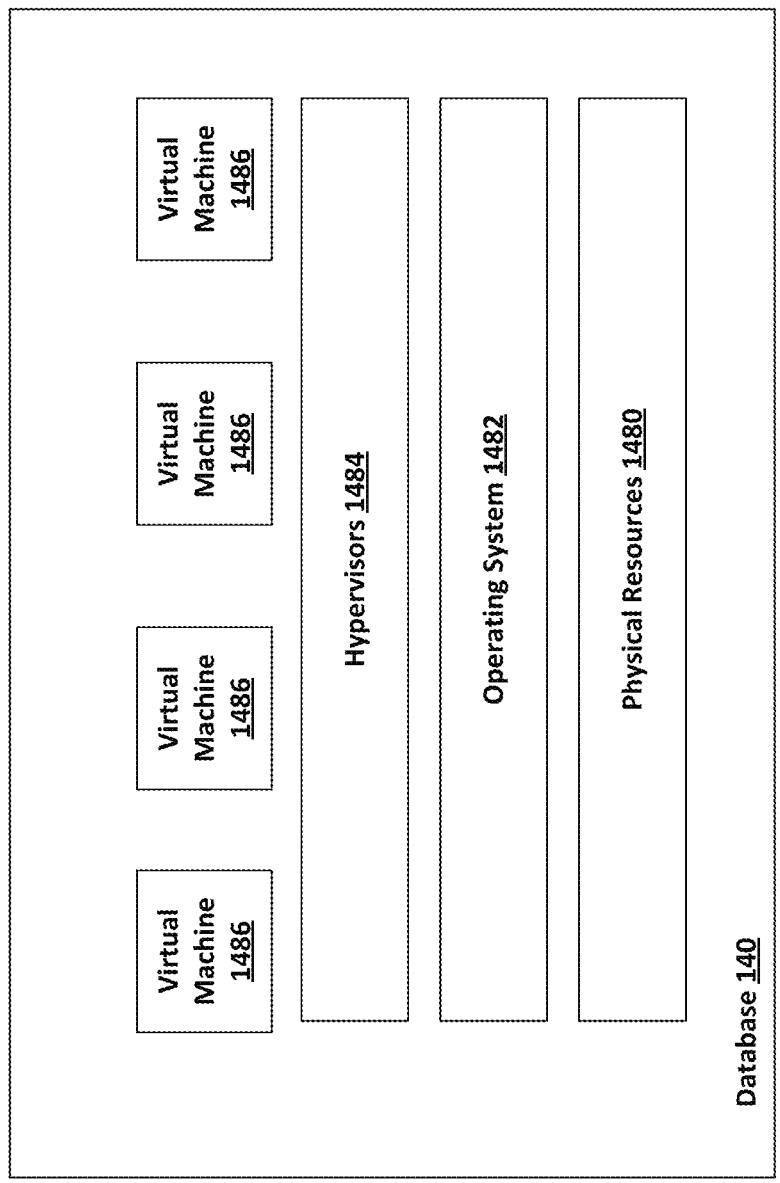
FIG. 14B depicts another example of a system, in accordance with some example implementations of the current subject matter.

FIG. 14B depicts an example implementation of the database 140, which provides database services. The database 140 may include physical resources 1480, such as at least one hardware servers, at least one storage, at least one memory, at least one network interface, and the like. The database 140 may also include infrastructure, as noted above, which may include at least one operating systems 1482 for the physical resources and at least one hypervisor 1484 (which may create and run at least one virtual machine 1486). For example, each multitenant application may be run on a corresponding virtual machine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method performed by a database system, comprising: detecting a first query targeting a first database object stored in a unified persistence format in a persistence store, wherein a first load unit is specified for loading the first database object into an in-memory store; determining whether to convert the first load unit to a second load unit based on one or more conditions; and responsive to determining to convert the first load unit to the second load unit for the first database object, loading the first database object into the in-memory store according to the second load unit without performing a rewrite of the first database object in the persistence store.

Example 2: The method of claim 1, wherein the first load unit is a column-loadable unit, and wherein the second load unit is a page-loadable unit.

Example 3: The method of any of Examples 1-2, wherein loading the first database object into the in-memory store according to the page-loadable unit comprises loading only pages relevant to the first query.

Example 4: The method of any of Examples 1-3, wherein the column-loadable unit comprises having a data subcomponent, a dictionary subcomponent, and an index subcomponent of a corresponding database object serialized together into a single page chain, and wherein the page-loadable unit comprises having a separate page chain for each of the data subcomponent, the dictionary subcomponent, and the index subcomponent of the first database object.

Example 5: The method of any of Examples 1-4, further comprising: determining whether persistence page chains may be shared for individual subcomponents of the first database object; creating a new version of a column fragment object for the first database object according to the second load unit; sharing a first persistence page chain between the new version of the column fragment object and an old version of the column fragment object for a first subcomponent in response to determining the first subcomponent meets one or more second conditions for the first persistence page chain to be shared; incrementing a first reference count corresponding to the first persistence page chain; preventing a second persistence page chain from being shared between the new version of the column fragment object and an old version of the column fragment object for a second subcomponent in response to determining the second persistence page chain may not be shared for the second subcomponent; creating a new attribute value container and copying data for the second subcomponent to the new attribute value container; and saving the new attribute value container to make the new version of the column fragment object visible to subsequent load threads.

Example 6: The method of any of Examples 1-5, wherein the first load unit is a page-loadable unit, wherein the second load unit is a column-loadable unit, and wherein loading the first database object into the in-memory store according to the column-loadable unit comprises loading an entirety of the first database object into the in-memory store.

Example 7: The method of any of Examples 1-6, wherein loading the first database object into the in-memory store according to the second load unit comprises: creating a first column fragment object in an in-memory store, wherein the first column fragment object corresponds to the first database object; incrementing a reference count associated with a first persistence page chain referenced by the first column fragment object in response to creating the first column fragment object in the in-memory store; and maintaining the first persistence page chain in the persistence store for as long as the reference count is greater than zero.

Example 8: The method of any of Examples 1-7, further comprising: copying metadata associated with the first persistence page chain to the first column fragment object in response to creating the first page main column fragment object in the in-memory store; and instantiating, with the copied metadata, a first in-memory representation of the first persistence page chain.

Example 9: The method of any of Examples 1-8, wherein the copied metadata comprises: a first pointer to a starting address of the first persistence page chain in the persistence store; and a second pointer to an ending address of the first persistence page chain in the persistence store.

Example 10: The method of any of Examples 1-9, wherein the unified persistence format comprises having a separate page chain for each of the data subcomponent, the dictionary subcomponent, and the index subcomponent of the first database object, and wherein a first condition, of the one or more conditions, comprises an access frequency of the first database object being less than a threshold.

Example 11: A system, comprising: at least one processor; and at least one memory including program instructions which when executed by the at least one processor causes operations comprising: detecting a first query targeting a first database object stored in a unified persistence format in a persistence store, wherein a first load unit is specified for loading the first database object into an in-memory store; determining whether to convert the first load unit to a second load unit based on one or more conditions; and responsive to determining to convert the first load unit to the second load unit for the first database object, loading the first database object into the in-memory store according to the second load unit without performing a rewrite of the first database object in the persistence store.

Example 12: The system of Example 11, wherein the first load unit is a column-loadable unit, and wherein the second load unit is a page-loadable unit.

Example 13: The system of any of Examples 11-12, wherein loading the first database object into the in-memory store according to the page-loadable unit comprises loading only pages relevant to the first query.

Example 14: The system of any of Examples 11-13, wherein the column-loadable unit comprises having a data subcomponent, a dictionary subcomponent, and an index subcomponent of a corresponding database object serialized together into a single page chain, and wherein the page-loadable unit comprises having a separate page chain for each of the data subcomponent, the dictionary subcomponent, and the index subcomponent of the first database object.

Example 15: The system of any of Examples 11-14, wherein the program instructions are further executable by the at least one processor to cause operations comprising: determining whether persistence page chains may be shared for individual subcomponents of the first database object; creating a new version of a column fragment object for the first database object according to the second load unit; sharing a first persistence page chain between the new version of the column fragment object and an old version of the column fragment object for a first subcomponent in response to determining the first subcomponent meets one or more second conditions for the first persistence page chain to be shared; incrementing a first reference count corresponding to the first persistence page chain; preventing a second persistence page chain from being shared between the new version of the column fragment object and an old version of the column fragment object for a second subcomponent in response to determining the second persistence page chain may not be shared for the second subcomponent; creating a new attribute value container and copying data for the second subcomponent to the new attribute value container; and saving the new attribute value container to make the new version of the column fragment object visible to subsequent load threads.

Example 16: The system of any of Examples 11-15, wherein the first load unit is a page-loadable unit, wherein the second load unit is a column-loadable unit, and wherein loading the first database object into the in-memory store according to the column-loadable unit comprises loading an entirety of the first database object into the in-memory store.

Example 17: The system of any of Examples 11-16, wherein loading the first database object into the in-memory store according to the second load unit comprises: creating a first column fragment object in an in-memory store, wherein the first column fragment object corresponds to the first database object; incrementing a reference count associated with a first persistence page chain referenced by the first column fragment object in response to creating the first column fragment object in the in-memory store; and maintaining the first persistence page chain in the persistence store for as long as the reference count is greater than zero.

Example 18: The system of any of Examples 11-17, wherein the program instructions are further executable by the at least one processor to cause operations comprising: copying metadata associated with the first persistence page chain to the first column fragment object in response to creating the first page main column fragment object in the in-memory store; and instantiating, with the copied metadata, a first in-memory representation of the first persistence page chain.

Example 19: The system of any of Examples 11-18, wherein the copied metadata comprises: a first pointer to a starting address of the first persistence page chain in the persistence store; and a second pointer to an ending address of the first persistence page chain in the persistence store.

Example 20: A non-transitory computer readable medium storing instructions, which when executed by at least one data processor, cause operations comprising: detecting a first query targeting a first database object stored in a unified persistence format in a persistence store, wherein a first load unit is specified for loading the first database object into an in-memory store; determining whether to convert the first load unit to a second load unit based on one or more conditions; and responsive to determining to convert the first load unit to the second load unit for the first database object, loading the first database object into the in-memory store according to the second load unit without performing a rewrite of the first database object in the persistence store.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method performed by a database system, comprising:
    detecting a first query targeting a first database object stored in a unified persistence format in a persistence store, wherein a first load unit is specified for loading the first database object into an in-memory store;
    determining whether to convert the first load unit to a second load unit based on one or more conditions; and
    responsive to determining to convert the first load unit to the second load unit for the first database object, loading the first database object into the in-memory store according to the second load unit without performing a rewrite of the first database object in the persistence store, wherein loading the first database object into the in-memory store according to the second load unit comprises:
        creating a first column fragment object in the in-memory store, wherein the first column fragment object corresponds to the first database object;
        incrementing a reference count associated with a first persistence page chain referenced by the first column fragment object and copying metadata associated with the first persistence page chain to the first column fragment object in response to creating the first column fragment object in the in-memory store;
        instantiating, with the copied metadata, a first in-memory representation of the first persistence page chain; and
        maintaining the first persistence page chain in the persistence store for as long as the reference count is greater than zero.

2. The method of claim 1, wherein the first load unit is a column-loadable unit, and wherein the second load unit is a page-loadable unit.

3. The method of claim 2, wherein loading the first database object into the in-memory store according to the page-loadable unit comprises loading only pages relevant to the first query.

4. The method of claim 3, wherein the column-loadable unit comprises having a data subcomponent, a dictionary subcomponent, and an index subcomponent of a corresponding database object serialized together into a single page chain, and wherein the page-loadable unit comprises having a separate page chain for each of the data subcomponent, the dictionary subcomponent, and the index subcomponent of the first database object.

5. The method of claim 1, further comprising:
   determining whether persistence page chains may be shared for individual subcomponents of the first database object;
   creating a new version of a column fragment object for the first database object according to the second load unit;
   sharing a second persistence page chain between the new version of the column fragment object and an old version of the column fragment object for a first subcomponent in response to determining the first subcomponent meets one or more second conditions for the second persistence page chain to be shared;
   incrementing a second reference count corresponding to the second persistence page chain;
   preventing a third persistence page chain from being shared between the new version of the column fragment object and the old version of the column fragment object for a second subcomponent in response to determining the third persistence page chain may not be shared for the second subcomponent;
   creating a new attribute value container and copying data for the second subcomponent to the new attribute value container; and
   saving the new attribute value container to make the new version of the column fragment object visible to subsequent load threads.

6. The method of claim 1, wherein the first load unit is a page-loadable unit, wherein the second load unit is a column-loadable unit, and wherein loading the first database object into the in-memory store according to the column-loadable unit comprises loading an entirety of the first database object into the in-memory store.

7. The method of claim 1, wherein the copied metadata comprises:
   a first pointer to a starting address of the first persistence page chain in the persistence store; and
   a second pointer to an ending address of the first persistence page chain in the persistence store.

8. The method of claim 1, wherein the unified persistence format comprises having a separate page chain for each of a data subcomponent, a dictionary subcomponent, and an index subcomponent of the first database object, and wherein a first condition, of the one or more conditions, comprises an access frequency of the first database object being less than a threshold.

9. A system, comprising:
   at least one processor; and
   at least one memory including program instructions which when executed by the at least one processor causes operations comprising:
      detecting a first query targeting a first database object stored in a unified persistence format in a persistence store, wherein a first load unit is specified for loading the first database object into an in-memory store;
      determining whether to convert the first load unit to a second load unit based on one or more conditions; and
      responsive to determining to convert the first load unit to the second load unit for the first database object, loading the first database object into the in-memory store according to the second load unit without performing a rewrite of the first database object in the persistence store, wherein loading the first database object into the in-memory store according to the second load unit comprises:
         creating a first column fragment object in the in-memory store, wherein the first column fragment object corresponds to the first database object;
         incrementing a reference count associated with a first persistence page chain referenced by the first column fragment object and copying metadata associated with the first persistence page chain to the first column fragment object in response to creating the first column fragment object in the in-memory store;
         instantiating, with the copied metadata, a first in-memory representation of the first persistence page chain; and
         maintaining the first persistence page chain in the persistence store for as long as the reference count is greater than zero.

10. The system of claim 9, wherein the first load unit is a column-loadable unit, and wherein the second load unit is a page-loadable unit.

11. The system of claim 10, wherein loading the first database object into the in-memory store according to the page-loadable unit comprises loading only pages relevant to the first query.

12. The system of claim 11, wherein the column-loadable unit comprises having a data subcomponent, a dictionary subcomponent, and an index subcomponent of a corresponding database object serialized together into a single page chain, and wherein the page-loadable unit comprises having a separate page chain for each of the data subcomponent, the dictionary subcomponent, and the index subcomponent of the first database object.

13. The system of claim 9, wherein the program instructions are further executable by the at least one processor to cause operations comprising:
   determining whether persistence page chains may be shared for individual subcomponents of the first database object;
   creating a new version of a column fragment object for the first database object according to the second load unit;
   sharing a second persistence page chain between the new version of the column fragment object and an old version of the column fragment object for a first subcomponent in response to determining the first subcomponent meets one or more second conditions for the second persistence page chain to be shared;
   incrementing a second reference count corresponding to the second persistence page chain;
   preventing a third persistence page chain from being shared between the new version of the column fragment object and the old version of the column fragment object for a second subcomponent in response to determining the third persistence page chain may not be shared for the second subcomponent;
   creating a new attribute value container and copying data for the second subcomponent to the new attribute value container; and
   saving the new attribute value container to make the new version of the column fragment object visible to subsequent load threads.

14. The system of claim 9, wherein the first load unit is a page-loadable unit, wherein the second load unit is a column-loadable unit, and wherein loading the first database object into the in-memory store according to the column-loadable unit comprises loading an entirety of the first database object into the in-memory store.

15. The system of claim 9, wherein the copied metadata comprises:
  a first pointer to a starting address of the first persistence page chain in the persistence store; and
  a second pointer to an ending address of the first persistence page chain in the persistence store.

16. A non-transitory computer readable medium storing instructions, which when executed by at least one data processor, cause operations comprising:
  detecting a first query targeting a first database object stored in a unified persistence format in a persistence store, wherein a first load unit is specified for loading the first database object into an in-memory store;
  determining whether to convert the first load unit to a second load unit based on one or more conditions; and
  responsive to determining to convert the first load unit to the second load unit for the first database object, loading the first database object into the in-memory store according to the second load unit without performing a rewrite of the first database object in the persistence store, wherein loading the first database object into the in-memory store according to the second load unit comprises:
  creating a first column fragment object in the in-memory store, wherein the first column fragment object corresponds to the first database object;
  incrementing a reference count associated with a first persistence page chain referenced by the first column fragment object and copying metadata associated with the first persistence page chain to the first column fragment object in response to creating the first column fragment object in the in-memory store;
  instantiating, with the copied metadata, a first in-memory representation of the first persistence page chain; and
  maintaining the first persistence page chain in the persistence store for as long as the reference count is greater than zero.

* * * * *